: : : 
United States Patent [19]

Michlin

[11] Patent Number: 5,381,213
[45] Date of Patent: Jan. 10, 1995

[54] PHOTORECEPTOR DRUM, CHARGE ROLLER AND DEVELOPER BRUSH SPINNER DEVICE

[76] Inventor: Steven B. Michlin, 5310 Bentley Suite 105, West Bloomfield, Mich. 48322

[21] Appl. No.: 101,020

[22] Filed: Aug. 3, 1993

[51] Int. Cl.$^6$ .................... G03G 15/00; G03G 21/00
[52] U.S. Cl. ........................ 355/211; 82/152; 82/165; 82/166; 142/53
[58] Field of Search ............... 355/211, 212, 213; 82/148, 152, 165, 166; 142/53

[56] References Cited

U.S. PATENT DOCUMENTS

| | | | |
|---|---|---|---|
| 2,027,174 | 1/1936 | Johnson | 82/166 |
| 2,876,807 | 3/1959 | Christensen | 142/53 X |
| 3,273,611 | 9/1966 | Hagquist et al. | 142/53 |
| 3,608,915 | 9/1971 | Hohwart | 82/165 |
| 3,862,391 | 1/1975 | Blomgren et al. | 219/68 |
| 4,535,660 | 8/1985 | Osterman | 82/31 |
| 4,839,690 | 6/1989 | Onoda et al. | 355/211 |
| 4,975,744 | 12/1990 | Ebata et al. | 355/211 |
| 5,079,401 | 1/1992 | Suchan | 219/121.68 |
| 5,132,728 | 7/1992 | Suzaki et al. | 355/200 |

Primary Examiner—Fred L. Braun

[57] ABSTRACT

To allow a lathe to turn the photoreceptor drums, charge rollers and developer brushes of printers, copiers, and facsimile machines, a unitary component adapts the object so it can be held on the lathe and drives the object. The adapting portion includes a flexible material such as a hose or o-ring to snugly receive the end extension of the drum, roller or brush. The drive portion connects with the drive bolt of the lathe and spins the object. In a second embodiment, the drive and adapter portions are separate components. A bore in the drive bushing is lined with a short piece of hose or one or more o-rings and snugly receives a protrusion from the adapter unit. A third embodiment replaces the drive bushing with tail stock forced against the adapter unit by the drive bolt of the lathe. A bore in the adapter unit lined with a flexible hose or o-ring snugly receives the end of the tail stock. A fourth embodiment of the invention provides an adapter unit which is received in the drive bushing and which may hold a different sized drum, roller or brush end extension by turning the adapter unit end for end. A fifth embodiment of the invention provides an adapter unit which has a portion received in the photoreceptor drum. A piece of flexible material is forced between the adapter unit and drum.

14 Claims, 5 Drawing Sheets

PHOTORECEPTOR DRUM, CHARGE ROLLER AND DEVELOPER BRUSH SPINNER DEVICE

BACKGROUND OF THE INVENTION

In printers, copiers and facsimile machines, dry toner is transferred to paper to produce an image. In simple terms, a charge roller rubs against a photoreceptor drum, and charges it. When light (the photo image) shines on the drum, the drumgets an image. The light removes the charge from the drumwhere it shines on the drum, in little pixel increments, so there is no charge where the image is, and the drum remains charged where there is no image. A developer brush is located close to the drum and is surrounded by dry toner. It applies toner to the drum where the drum is not charged. So where the image is, the drum is black, and the drum is white (no image) where the drum is charged. A second charge roller is on the opposite side of the paper from the drum. The drum rotates forward and the second charge roller attracts toner from the drum onto the paper. The image is transferred from the drum to the paper. Toner is then melted on the paper by fuser rollers.

The photoreceptor drum is exposed to ozone and the outer portion of the charge transport layer's (the outermost layer) structure changes from its original state to a different state, reducing its performance level and the quality of its image. Toner, paper particles and other debris also get on the drum, roller and developer brush. When charge rollers get dirty, for example, they can malfunction, causing streaks and/or grey haze on the output paper.

As a result of this, the drums, rollers and developer brushes need to be cleaned, polished, waxed and otherwise treated. For example, once the outer portion of the charge transport layer (the modified portion) is removed from the drum surface, the surface may need to be treated with a hard protective coating. The drums, rollers and brushes are usually cleaned with a cotton pad soaked in alcohol. In the copier, laser printer, facsimile machine industry, and in the cartridge remanufacturing industry, the lathes available specifically to rotate drums for ease of treatment have small inadequate motors designed for one speed. If any real pressure is applied on the drums, rollers and brushes, the lathe will stop. It is believed that no means currently exists in the industry for turning charge rollers and developer brushes on any type of lathe. More powerful motors with variable speed are needed to turn these devices so they may be properly cleaned and treated.

In copending appplication Ser. No. 944,189, filed Sep. 11, 1992, a spinning device was disclosed which used a drive member, tail stock and adapter unit to mount and spin drums, rollers and brushes on a lathe. The invention of this application is an improvement over the prior invention in that it is easier to manufacture, has less parts, and is quicker for the user to assemble. Drive pins, for example, are replaced by snug-fit connections.

SUMMARY OF THE INVENTION

This disclosure is directed towards a set of components used to modify a conventional, variable speed, powerful wood lathe so it may be used to rotate photoreceptor drums, charge rollers or brushes used in dry toner printers, copiers, and facsimile machines.

It is an object of this invention to provide a unitary adapter and drive device for attaching and spinning photoreceptor drums, charge rollers and developer brushes on variable speed lathes.

It is a further object of this invention to provide a single drive bushing for receiving different-sized adapter units so variously dimensioned drums, rollers and brushes may be attached and rotated on the lathe.

Still another object of this invention is to provide an adapter unit which may be used with tail stock to attach and spin drums, rollers and brushes on a variable speed lathe without the need for a drive bushing.

Finally, it is an object of this invention to provide an adapter unit designed to hold and spin photoreceptor drums of the type having an orifice or opening in their end pieces.

By use of these components, conventional powerful, variable speed lathes readily available on the market may be used to rotate photoreceptor drums for the purposes of cleaning, waxing, polishing, drum coating or other treatment. Similar treatments may be performed on charge rollers and developer brushes to increase the performance and life of these devices.

DESCRIPTION OF THE PREFERRED EMBODIMENT

Figure 1:
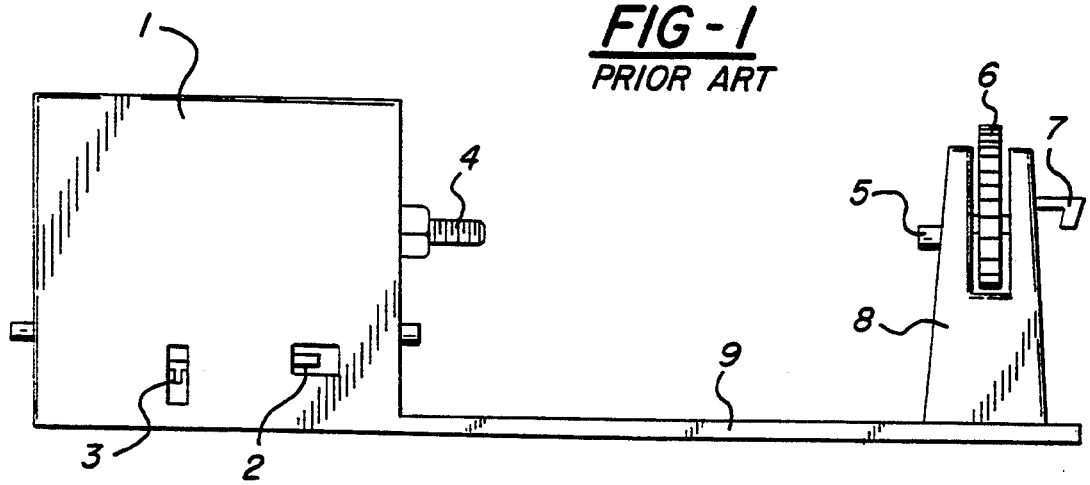
FIG. 1 shows a conventional, variable speed wood lathe.

FIG. 1 shows a conventional, variable speed wood lathe which will be modified by this invention to rotate (spin) photoreceptor drums, charge rollers and developer brushes. The motor is indicated at reference numeral 1. There is an on/off switch 2. A lever 3 moves the motor up and down, changing the belt tension so the belt can be moved to a different pulley and the speed of the lathe changed. The motor turns a drive bolt 4 which is nut-shaped at one end with an outside-threaded hollow rod extending from the nut-shaped portion. A hollow holding member 5 is located at the other end of the lathe and may be moved towards or away from the drive bolt 4 by a wheel 6. A lever 7 fixes the holding member 5 in the chosen position. The whole attachment 8 can also be positioned relative to the drive bolt 4 by sliding the attachment along the platform 9 and fixing it in the desired location. In conventional operation, the device to be spinned (for example a block of wood) would be attached between the drive bolt 4 and the holding member 5. Usually a member with a cross-shaped end would be attached to the drive bolt, and something placed in the holding member 5 would force the device against the cross-shaped end. As the motor turns the drive bolt along its longitudinal axis, the device would rotate or spin with the drive bolt.

Figure 2:
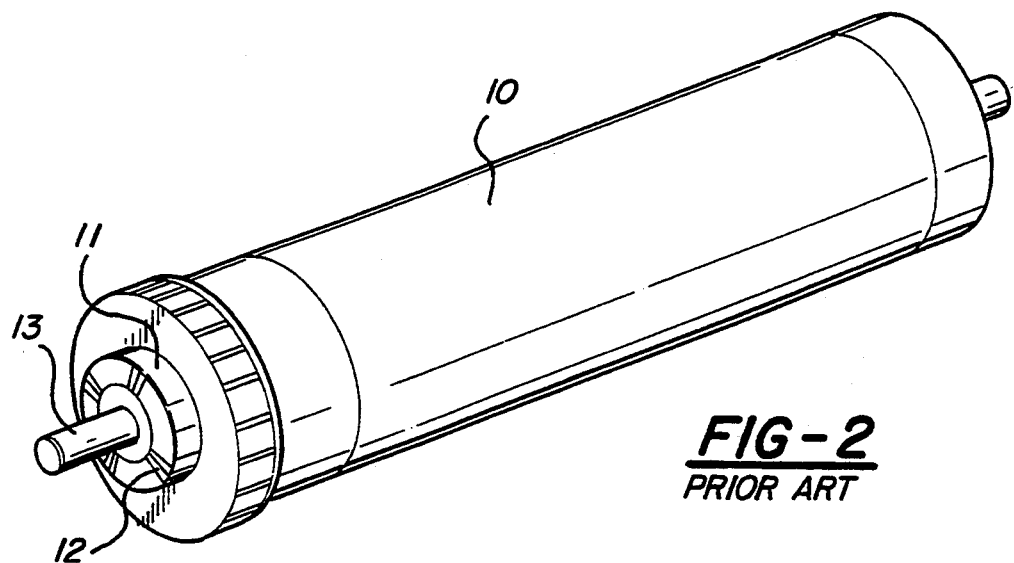
FIG. 2 shows a conventional photoreceptor drum.

FIG. 2 shows a conventional photoreceptor drum 10. It has a circular end piece 11 with interior spoke-like members 12. A cylindrical metal end extension 13 extends from the end piece and the drum.

Figure 3:
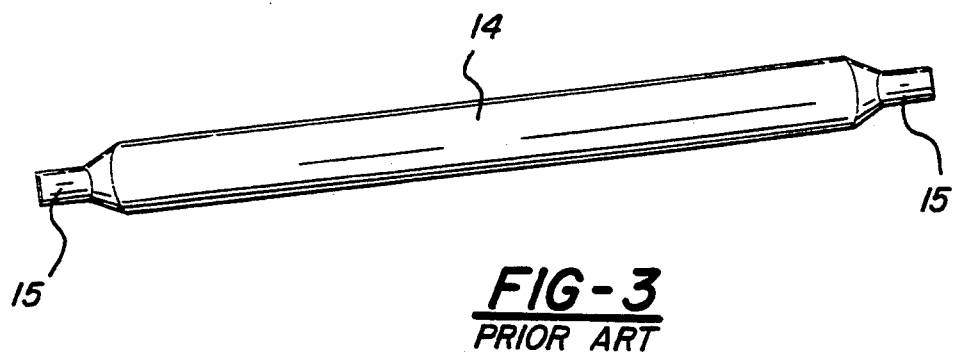
FIG. 3 shows a conventional charge roller.
Figure 4:
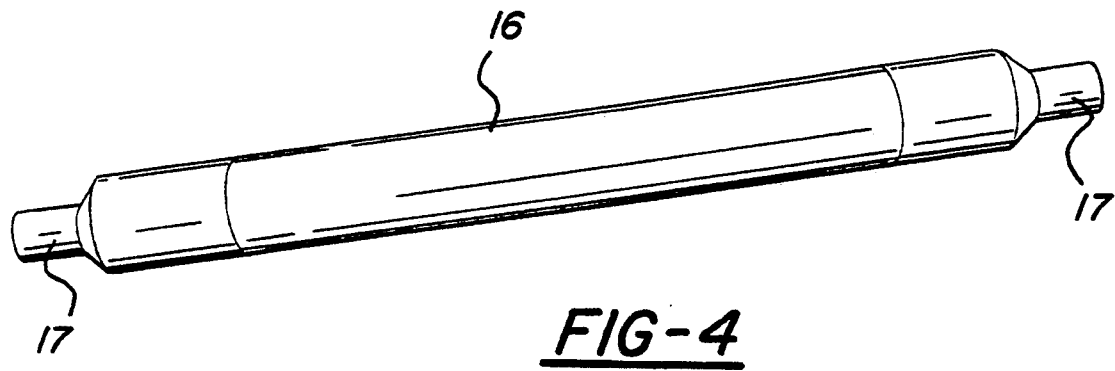
FIG. 4 shows a conventional developer brush.

FIG. 3 shows a conventional charge roller 14. It has short metal cylindrical end extensions 15. FIG. 4 shows a conventional developer brush 16. It is larger in diameter than the charge roller 14, and the metal cylindrical end extensions 17 of the developer brush 16 are also larger in diameter than the end extensions 15 of the charge roller 14 but usually smaller in diameter than the cylindrical end extensions 13 of the photoreceptor drum.

Figure 5:
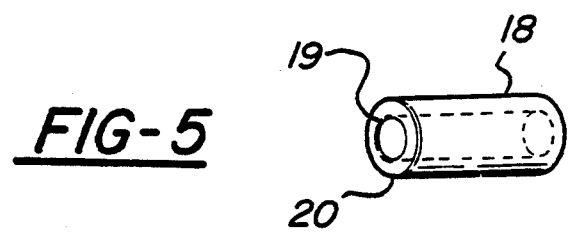
FIG. 5 shows a short piece of flexible hose for use in this invention.

FIG. 5 shows a short, flexible piece of hose 18 used in this invention to attach the drum, roller or brush to a drive means for spinning the drum, roller or brush on the lathe. The hose 18 has an inside diameter 19 sized to fit around the cylindrical end extensions 13, 15, and 17 of the drum, roller and brush, respectively. The inside diameter 19 of the hose 18 would be different in each case. The outside diameter 20 of the hose 18 allows the hose 18, in the first embodiment of this invention, to become part of the unitary adapter and drive device 21 shown in FIG. 6.

Figure 6:
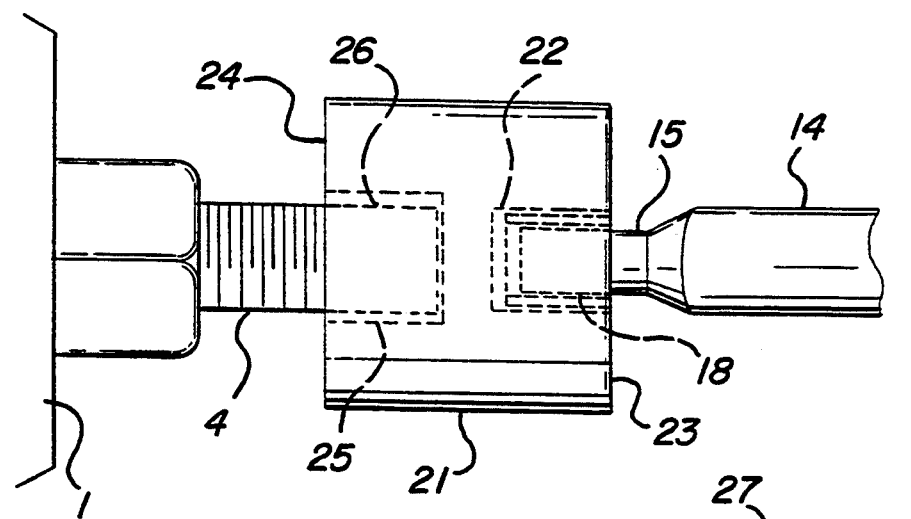
FIG. 6 shows a unitary drive and adapter device of this invention.

The unitary adapter and drive device 21 may be in the shape of a small cylinder. A bore 22 is formed in a first end 23 of the device. The outside diameter 20 of the hose 18 is sized to fit snugly into the bore 22. In the second end 24 of the unitary adapter and drive device 21, another bore 25 is formed and provided with inside threads 26. These threads 26 are designed to allow the unitary adapter and drive device 21 to be screwed onto the hollow drive bolt 4 of the lathe 1. In FIG. 6, the charge roller 14 is used to illustrate the invention, which may also be used with the drum 10 and brush 16. The end extension 15 of the roller 14 is snugly received within the inside diameter 19 of the hose 18. The hose 18 is snugly received in the bore 22 of the unitary adapter and drive device 21. When the lathe 1 turns the drive bolt 4, the snugness of the fits provided by the hose 18 causes the roller 14 to spin with the device 21, enabling various treatment of the roller surface. The opposite end of the roller 14 may be held on the lathe by the conventional holding member 5 or other suitable means. An alternate way to turn the charge roller 14 is to use a lathe-chuck (not shown), however, the lathe-chuck can leave wear marks on the metal shaft 15 of the charge roller 14. A lathe-chuck will be defined as either a chuck as used in a drill or as used in a lathe. One way to prevent these wear marks on the shaft 15 of the charge roller 14 is to coat or spray-coat the inside of the lathe-chuck with a soft material. It can then grip the shaft 15 of the charge roller 14 without leaving unwanted wear marks. Various materials may used to spray-coat the inside of the lathe-chuck, for example rubber coating, foam coating, and most resilient materials, urethane rubber, open-cell foam, closed-cell foam, fabric, and any material that prevents wear marks on the metal shaft 15 of the charge roller 14. One coat or multiple coats of material may be used. The lathe-chuck may be also coated by gluing or taping smooth strips of rubber or rubber-like material, open-cell foam, closed-cell foam, fabric, rubber, urethane rubber, or any resilient material on the inside of the lathe-chuck, rather than coating it on with a spray coating as previously described.

Figure 7:
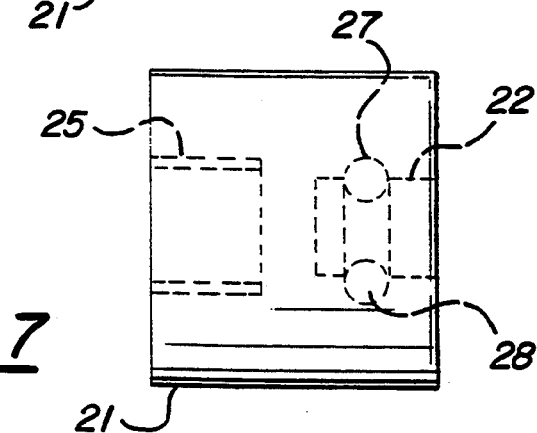
FIG. 7 shows the unitary device of FIG. 6 modified to use an o-ring.

FIG. 7 shows a modification to the unitary adapter and drive device 21. Rather than using the hose 18, a groove 27 is machined in the bore 22 of the device 21. A flexible o-ring 28 is received in the groove 27 and performs the function of the hose 18. The o-ring 28 is sized to snugly receive the end extension 13, 15 or 17 of the drum 10, roller 14 or brush 16. Multiple grooves 27 and o-rings 28 could be used if a more snug, surer fit is desired or required.

Figure 8:
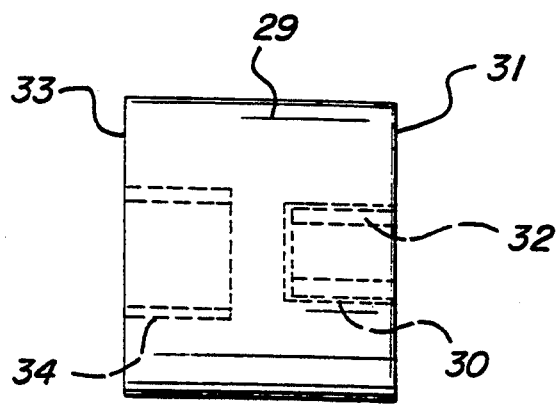
FIG. 8 shows the drive bushing of the second embodiment of this invention.

In the second embodiment of the invention, the drive bushing and adapter unit are separate components. Their use together eliminates the need for conventional tail stock in fixing the drum, roller or brush to the lathe, and allows different adapter units for attachment to drums, rollers or brushes with different sized cylindrical end extensions to be used with the same drive bushing. FIG. 8 shows a drive bushing 29 with a bore 30 in a first end 31. A short piece of flexible hose 32 is fitted in the bore 30. The second end 33 of the drive bushing 29 contains a threaded bore 34 for screwing the drive bushing 29 on the drive bolt 4 of the lathe 1.

Figure 9:
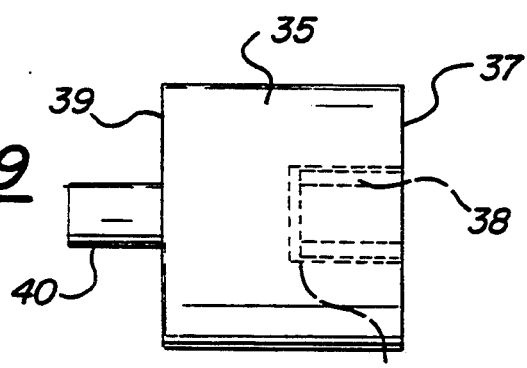
FIG. 9 shows the adapter unit for connection with the drive bushing of FIG. 8.
Figure 10:
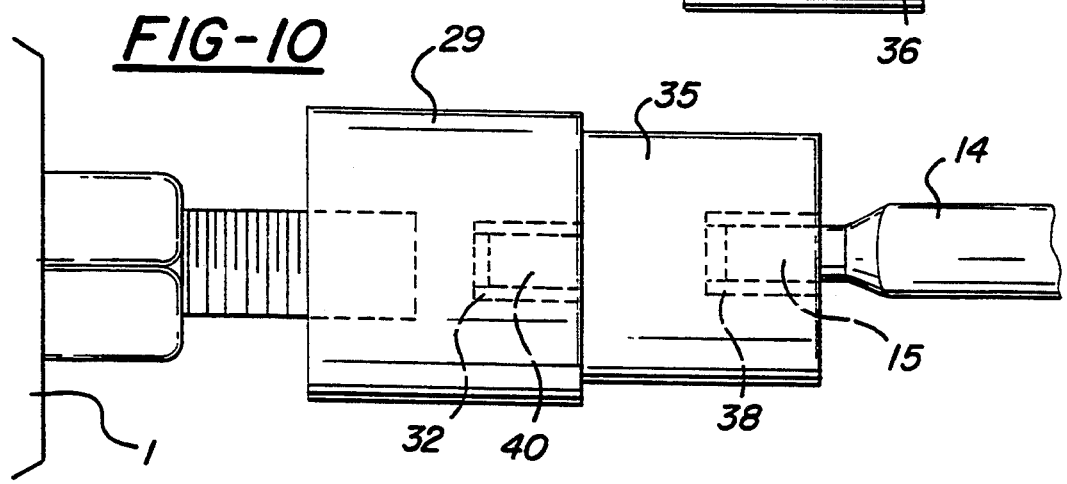
FIG. 10 is an illustration showing how the drive bushing and adapter unit connect to spin the roller.

The adapter unit 35 shown in FIG. 9 has a bore 36 in a first end 37. A short piece of flexible hose 38 is snugly fitted in the bore 36. The hose 38 is for receiving the cylindrical end extension 13, 15 or 17 of the drum 10, roller 14 or brush 16, respectively. The second end 39 of the adapter unit 35 includes a cylindrical protrusion 40 sized to snugly fit in the hose 32 of the drive bushing 29. The complete assembly is illustrated in FIG. 10. When the drive bushing 29 is rotated by the lathe drive bolt 4, the snugness of the fit between the hose 32 and the adapter unit protrusion 40 causes the adapter unit 35 to spin with the drive bushing 29, and the snugness of the fit between the hose 38 of the adapter unit 35 and the cylindrical end extension of the drum, roller or brush to cause the drum, roller or brush to spin on the lathe for particular treatment. Different adapter units 35 with differently sized bores 36 and hoses 38 for receiving the various cylindrical end extensions of the drums, rollers or brushes may be used with the same drive bushing 29, eliminating the need for manufacturing additional drive bushings and simplifying the manufacturing process of the adapter unit portion of the invention.

Figure 11:
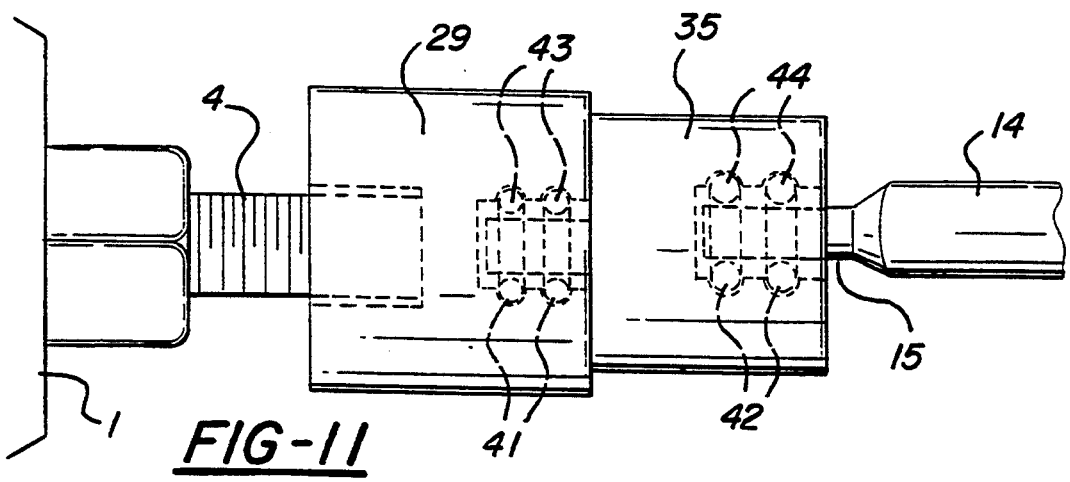
FIG. 11 shows a modified adapter unit and drive bushing.

As shown in FIG. 11, the hoses 32 and 38 of the drive bushing 29 and adapter unit 35, respectively, may be replaced by similar means. Grooves 41 and 42 are machined in the bores 30 and 36 of the drive bushing 29 and adapter unit 35, respectively. The grooves 41 and 42 receive o-rings 43 and 44, respectively. The o-rings 43 and 44 perform the same function as the hoses. One or more o-rings 43 and 44 may be used in each bore 30 and 36, respectively, as desired or required to increase the snugness and sureness of the fits.

Figure 12:
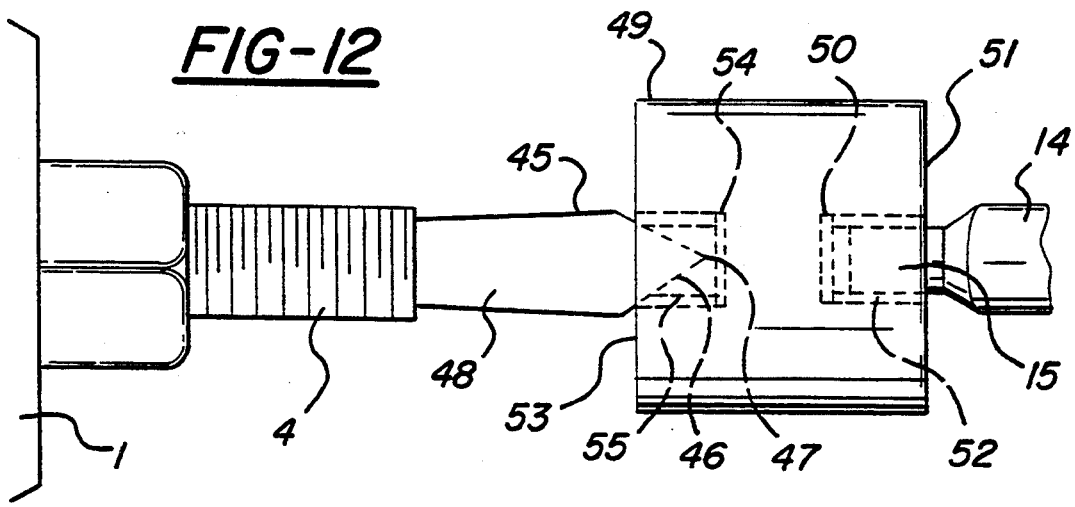
FIG. 12 shows the third embodiment of this invention, with tail stock replacing the drive bushing.

In a third embodiment of this invention, the drive bushing is eliminated. FIG. 12 shows a piece of tail stock 45 comprising a first end made up of a short conical portion 46 converging to a point 47, and a second end comprising tapered cylindrical portion 48 widening to the short conical portion 46. An adapter unit 49 has a bore 50 in a first end 51. The bore 50 is lined by a short piece of flexible hose 52 for snugly receiving the cylindrical end extension 13, 15 or 17 of the drum 10, roller 14 or brush 16. A second end 53 of the adapter unit includes a bore 54. A short piece of flexible hose 55 is snugly received in the bore 54, and in turn receives the point 47 and part of the short conical portion 46 of the tail stock 45. At the other end of the tail stock 45, the tapered cylinder 48 is partially received in the hollow drive bolt 4 of the lathe 1. The drive bolt 4 forces the tail stock against the adapter unit 49, creating a pressure attachment such that when the drive bolt 4 is turned by the lathe, the tail stock 45, adapter unit 49 and drum 10, roller 14 or brush 16 all spin, allowing the drum, roller or brush to be treated as desired.

Figure 13:
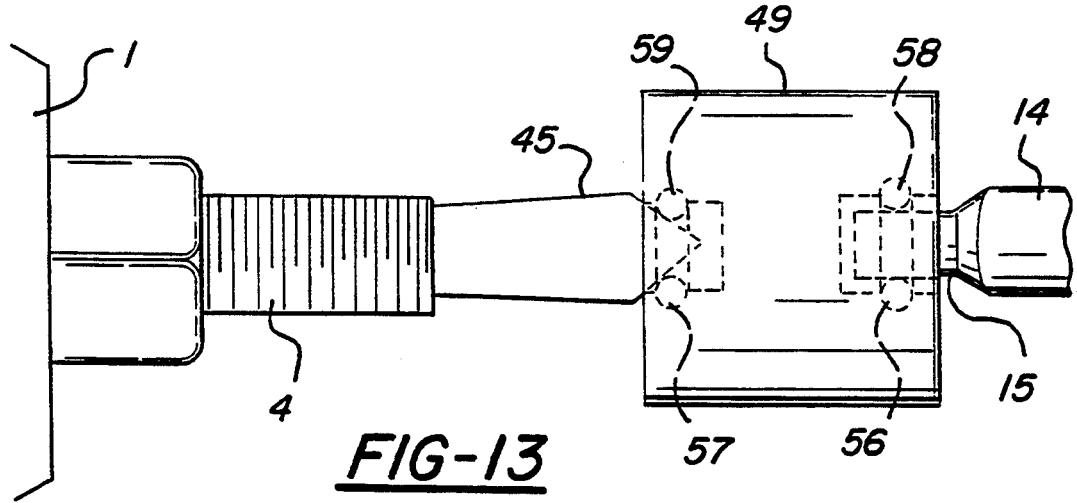
FIG. 13 is a modification of FIG. 12 illustrating how o-rings may replace the hose as the flexible fitting material.

Again, the hoses 52 and 55 of the adapter unit 49 may be replaced by flexible o-rings. This is shown in FIG. 13. Grooves 56 and 57 are machined in the bores 50 and 54; respectively, of the adapter unit 49. The grooves 56 and 57 receive o-rings 58 and 59, respectively, which perform the same function as the hoses. Each bore 50 and 54 of the adapter unit 49 may include more than one groove and o-ring if a more snug, surer fit is required.

Various modifications of this invention are possible. For example, the bores of the adapter portions of the three embodiments may be sized to receive end extensions other than the end extensions 13, 15 and 17 of the drum 10, roller 14 or brush 16. The bores could be fitted with hose pieces having inside diameters, for instance, large enough to receive the circular end piece 11 of the drum 10. In another modification, different combinations of hoses and o-rings may be used. The adapter unit 49 of FIG. 12 could, for example, use a hose in bore 50 for receiving the end extension 15 of roller 14 as shown, but an o-ring in bore 54 for receiving the first end of the tail stock rather than the hose 55. The components of this invention are small in number, easy to manufacture, quick for the user to assemble, and readily adaptable for spinning a variety of tools or parts.

Figure 14:
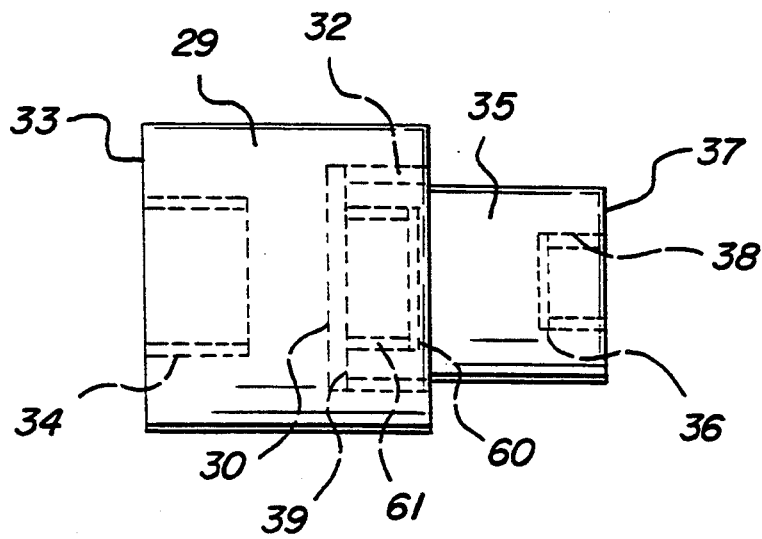
FIG. 14 shows a fourth embodiment of this invention which comprises an adapter unit modified to receive end extensions of drums, rollers or brushes at either end.

FIG. 14 shows a more significant modification. In a fourth embodiment of this invention, the drive bushing 29 and adapter unit 35 of FIGS. 8 and 9, respectively, are modified. The protrusion 40 of the adapter unit 35 is eliminated and replaced with a bore 60 in the second end 39 of the adapter unit 35. A flexible receiving material, which may be a short piece of hose 61 as shown or one or more flexible o-rings, is fitted in the bore 60. The bore 60 and hose 61 are sized to receive end extensions 13, 15 and 17 of drums, rollers and brushes having different diameters than the diameters of the end extensions which the opposite bore 36 and hose 38 are sized to receive. So the adapter unit 35 may be simply turned end for end to accommodate different drums, rollers and brushes. To accomplish this, the diameters of the bore 30 and hose 32 of the drive bushing 29 are increased to receive snugly the whole first end 37 or second end 39 of the adapter unit 35.

Figure 15:
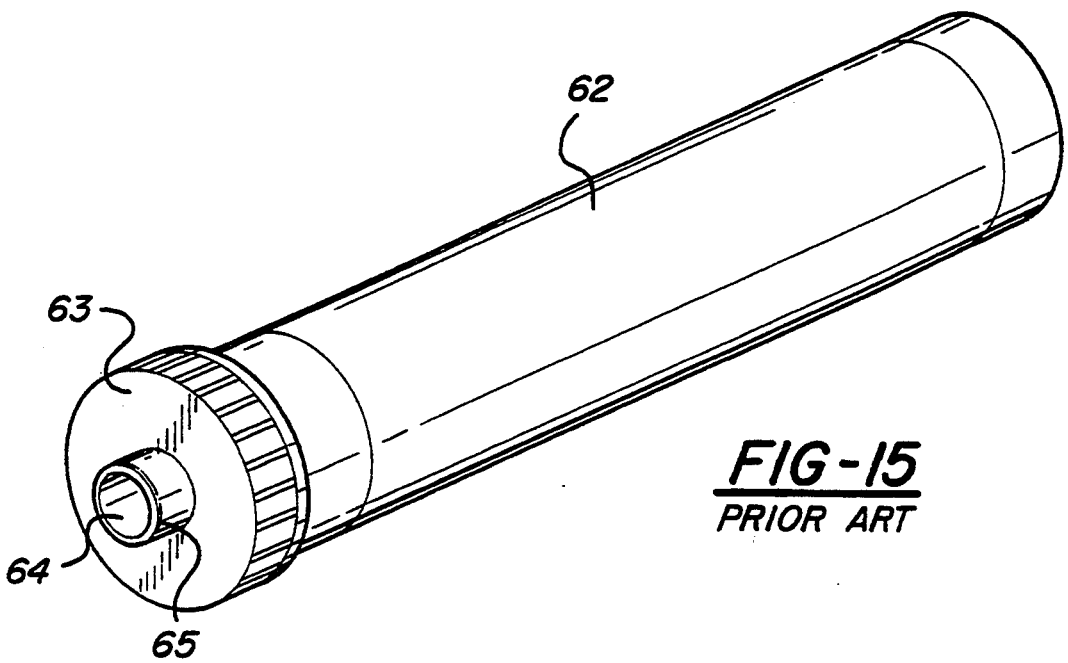
FIG. 15 shows another type of conventional photoreceptor drum.

FIG. 15 shows a photoreceptor drum 62 with a different type of end piece 63 than the photoreceptor drum 10 shown in FIG. 2. Rather than having a cylindrical end extension, the end piece 63 has an orifice 64 with a rim 65. The fifth embodiment of this invention is designed to accommodate this type of drum end piece 63 so the drum 62 of FIG. 15 may also be turned on a lathe.

Figure 16:
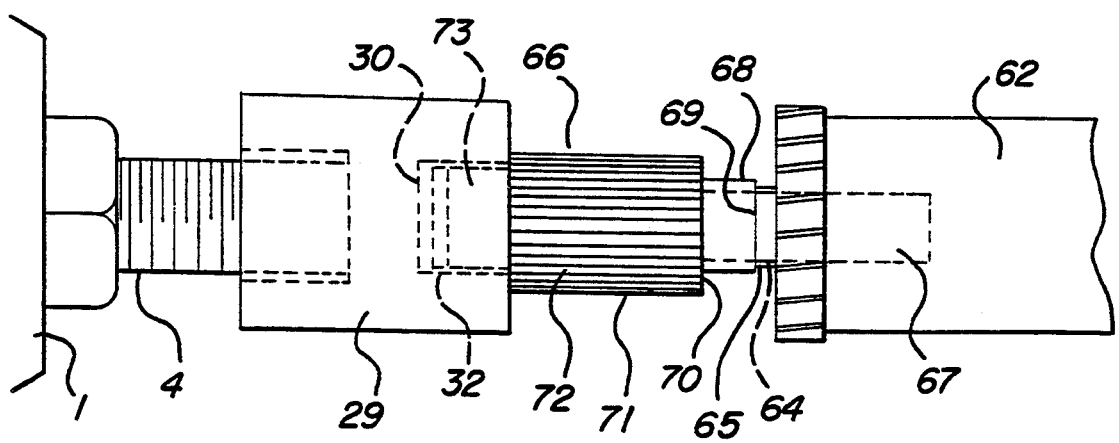
FIG. 16 shows a fifth embodiment of this invention which comprises an adapter unit modified to hold and spin the drum of FIG. 15.

FIG. 16 shows this embodiment. An adapter unit 66 has a first cylindrical portion 67 sized to fit within the orifice 64 of the drum 62. A flexible piece of material, shown as a short piece of hose 68 but which may also be one or more flexible washers or o-rings, is fitted around the first cylindrical portion 67 such that one side 69 of the hose 68 abuts against the rim 65 of the orifice 64 when the first cylindrical portion 67 is slid into the orifice 64. The second side 70 of the hose 68 abuts against a second, wider cylindrical portion 71 of the adapter unit 66. This second cylindrical portion 71 may be scored with lines 72, or knurled, to make the adapter unit 66 easier to grip. The adapter unit 66 has a third cylindrical portion 73 sized to fit into the drive bushing 29 first shown in FIG. 8. In operation, the drive bushing 29 snugly receives the third cylindrical portion 73 in the flexible material (hose 32) lining bore 30. The drum 62 is held on the lathe between the adapter unit 66 and conventional live tail stock (not shown) at the other end of the lathe adjacent holding member 5. Live tail stock freely rotates. It has bearings that rotate with the drum 62 so little heat is generated. The side 69 of the hose 68 is forced firmly against the rim 65 of the drum orifice 64, and the side 70 of the hose 68 is firmly pressed against the second cylindrical portion 71 of the adapter unit 66. The forced connection is of a magnitude such that when the drive bushing 29 rotates the adapter unit 66, the drum 62 is also turned.

Figure 17:
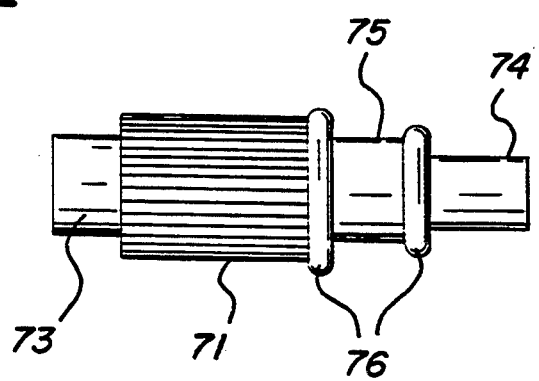
FIG. 17 shows a modification of the adapter unit illustrated in FIG. 16.

FIG. 17 shows a modification of the adapter unit 66. The first cylindrical portion 67 is divided into two segments having different diameters. The first segment 74 would be sized to fit into a particularly-sized drum orifice 64, and the second segment 75 would be sized to fit into a larger-sized orifice 64. The orifice 64 diameters differ from drum to drum and sometimes from one end of a drum to the other end. If the larger diameter segment 75 of the adapter unit is needed, the smaller diameter first segment 74 would simply slide all the way into the drum prior to the second segment 75. In FIG. 17 the flexible materials providing the forced-contact connection between the adapter unit 66 and drum 62 are shown as o-rings 76, but may also be short pieces of hose or flexible washers.

The description is not meant to limit the scope of the invention. The invention as described and as claimed in the following claims is intended to encompass reasonable equivalents and obvious modifications.

What is claimed is:

1. A spinning means for modifying a lathe so it may be used to turn the photoreceptor drums, charge rollers and developer brushes used in dry toner copying, printing and facsimile machines, said drums, rollers and brushes including end extensions, said spinning means comprising an adapting means having a bore in a first end, said bore being lined by flexible material for snugly receiving said end extension of said drum, roller or brush, and a drive means for turning said adapting means when said lathe is in operation, wherein said flexible material is a piece of hose and said adapting means and said drive means are a unitary component.

2. A spinning means as in claim 1 wherein said lathe has a drive bolt, said unitary component having an end opposite said first end of said adapting means with an inside-threaded bore for receiving said drive bolt.

3. A spinning means for modifying a lathe so it may be used to turn the photoreceptor drums, charge rollers and developer brushes used in dry toner copying, printing and facsimile machines, said drums, rollers and brushes including end extensions, said spinning means comprising an adapting means having a bore in a first end, said bore being lined by flexible material for snugly receiving said end extension of said drum, roller or brush, and a drive means for turning said adapting means when said lathe is in operation, said lathe having a drive bolt, said drive means having a first end with a bore lined by a flexible material and a second end with an inside-threaded bore for receiving said drive bolt of said lathe, said flexible material in said bore in said first end of said drive means being a piece of hose, and said adapting means having a second end opposite said first end of said adapting means, said second end of said adapting means including a protrusion, whereby said piece of hose lining said bore in said first and of said drive means snugly receives said protrusion, connecting said adapting means and said drive means.

4. A spinning means as in claim 3 wherein said flexible material lining said bore in said first end of said adapting means is a piece of hose.

5. A spinning means as in claim 3 wherein said bore in said first end of said adapting means has one or more inner grooves, and said flexible material in said bore in said first end of said adapting means is one or more o-rings, each o-ring fitted in one of said one or more inner grooves.

6. A spinning means for modifying a lathe so it may be used to turn the photoreceptor drums, charge rollers and developer brushes used in dry toner copying, printing and facsimile machines, said drums, rollers and brushes including end extensions said spinning means comprising an adapting means having a bore in a first end, said bore being lined by flexible material for snugly receiving said end extension of said drum, roller or brush, and a drive means for turning said adapting means when said lathe is in operation, said lathe having a hollow drive bolt, said drive means being a piece of tail stock having first and second ends, said second end of said tail stock being received in said hollow drive bolt of said lathe, said adapting means having a second end opposite said first end of said adapting means, said second end of said adapting means including a bore lined by flexible material for snugly receiving part of said first end of said tail stock, whereby said drum, roller or brush is held and turned on said lathe.

7. A spinning means for modifying a lathe so it may be used to turn the photoreceptor drums, charge rollers and developer brushes used in dry toner copying, printing and facsimile machines, said drums, rollers and brushes including end extensions, said spinning means comprising an adapting means having a bore in a first end said bore being lined by flexible material for snugly receiving said end extension of said drum, roller or brush, and a drive means for turning said adapting means when said lathe is in operation, said lathe having a drive bolt, said drive means having a first end with a bore lined by a flexible material and a second end with an inside-threaded bore for receiving said drive bolt of said lathe, said adapting means having a second end opposite said first end of said adapting means, said second end of said adapting means also including a bore lined by a flexible material for snugly receiving said end extension of said drive roller or brush said bore and flexible material in said second end of said adapting means being sized differently than said bore and flexible material in said first end of said adapting means to receive different-sized end extensions, whereby said first and second ends of said adapter means may be alternately received by said flexible material in said bore in said first end of said drive means.

8. A spinning means as in claim 7 wherein said flexible materials lining said bores in said first end of said drive means and said first and second ends of said adapting means are pieces of hose.

9. A spinning means for modifying a lathe so it may be used to turn a photoreceptor drum of the type having an end piece with an orifice surrounded by a rim, said spinning means comprising an adapting means with a first portion for fitting into said orifice and a second, wider portion connected to said first portion, said adapting means further including a piece of flexible material fitted over part of said first portion adjacent said second portion such that when said first portion is fitted in said drum orifice said piece of flexible material is pressed between said second portion and said rim surrounding said orifice, said adapting means also including a third portion connected to said second portion such that said second portion is between said first and third portions, said spinning means further comprising a drive means with a first end for attachment to said third portion and a second end for attachment to said lathe, whereby said lathe turns said drive means, adapting means and said drum.

10. A spinning means as in claim 9 wherein said second, wider portion of said adapting means is scored with lines for easy gripping.

11. A spinning means as in claim 9 wherein said piece of flexible material is a short hose.

12. A spinning means as in claim 9 wherein said first portion of said adapting means is divided into two cylindrical segments, a first segment for fitting into a smaller diameter drum orifice and a second segment having a larger diameter than said first segment for fitting into larger drum orifices, said second segment being located between said first segment and said second, wider portion of said adapting means, and another piece of flexible material is fitted around part of said first segment adjacent said second segment.

13. A spinning means as in claim 12 wherein said piece of flexible material fitted over part of said first portion adjacent said second, wider portion of said adapting means and said piece of flexible material fitted around part of said first segment adjacent said second segment of said first portion of said adapting means are o-rings.

14. A spinning means as in claim 12 wherein said drive means first end has a bore with a short piece of flexible hose fitted into it for snugly receiving said third portion of said adapting means.

* * * * *